United States Patent [19]
Milroy et al.

[11] Patent Number: 4,475,761
[45] Date of Patent: Oct. 9, 1984

[54] VEHICLE HAVING PIVOTABLE WALL PARTS

[76] Inventors: Anthony G. Milroy, 87 Station Rd., Cheadle Hulme, Cheadle; Peter Woof, Old Dairy Cottage, Dent, Sedburgh Cumbria LA10 5S0, both of England

[21] Appl. No.: 377,656

[22] Filed: May 13, 1982

[30] Foreign Application Priority Data

| May 15, 1981 | [GB] | United Kingdom | 8115031 |
| May 15, 1981 | [GB] | United Kingdom | 8115032 |
| Oct. 15, 1981 | [GB] | United Kingdom | 8131063 |

[51] Int. Cl.$^3$ .................................. B62D 25/00
[52] U.S. Cl. ...................... 296/61; 49/193; 414/537; 280/712
[58] Field of Search ........ 296/61, 51, 56, 57 R, 296/57 A, 181; 49/193; 16/147; 414/537

[56] References Cited

U.S. PATENT DOCUMENTS

| 1,735,408 | 11/1929 | Nein | 296/51 |
| 2,215,631 | 9/1940 | Young | 296/61 |
| 2,797,960 | 7/1957 | Enders et al. | 296/61 |
| 3,210,118 | 10/1965 | Chieger | 296/61 |
| 3,485,523 | 12/1969 | Carr | 296/181 |
| 3,550,801 | 12/1970 | Larson | 296/61 |
| 4,346,929 | 8/1982 | Peters | 296/181 |

FOREIGN PATENT DOCUMENTS

| 207524 | 7/1924 | United Kingdom . |
| 371133 | 4/1932 | United Kingdom . |
| 411635 | 6/1934 | United Kingdom . |
| 692147 | 5/1953 | United Kingdom ............. 296/57 A |
| 739036 | 10/1955 | United Kingdom . |
| 747815 | 4/1956 | United Kingdom . |
| 1164676 | 9/1969 | United Kingdom . |
| 1561058 | 2/1980 | United Kingdom . |

*Primary Examiner*—Robert R. Song
*Attorney, Agent, or Firm*—Alan H. Levine

[57] ABSTRACT

A vehicle comprises a body having a deck and a wall, said wall comprising two parts connected for relative pivotal movement about a horizontal axis. There may be first, releasable, pivot means having an axis above the deck, and second, releasable, pivot means adjacent a lower edge of one of the wall parts for allowing the wall to pivot with respect to the deck, so that on release of the first pivot means the wall may pivot about the second pivot means and on release of the second pivot means the wall may pivot about the first pivot means. There may be third, releasable, pivot means having an axis spaced further from the deck than the axis of the first pivot means so that on release of the first and second pivot means the wall may pivot about the third pivot means.

11 Claims, 16 Drawing Figures

VEHICLE HAVING PIVOTABLE WALL PARTS

This invention relates to vehicles and parts thereof and vehicle suspension devices.

The term vehicle is intended to include trailers and is not limited to self-propelled vehicles.

According to this invention a vehicle comprises a body having a deck and a wall, said wall comprising two parts connected for relative pivotal movement about a horizontal axis.

The vehicle may comprise first, releasable, pivot means having an axis above the deck, and second, releasable, pivot means adjacent a lower edge of one of the wall parts for allowing the wall to pivot with respect to the deck, so that on release of the first pivot means the wall may pivot about the second pivot means and on release of the second pivot means the wall may pivot about the first pivot means.

With such an arrangement, the first releasable pivot means can be released, and the wall lowered about the second pivot means; or the second releasable pivot means can be released to allow the wall to pivot for tipping.

The wall may comprise three parts respectively hinged about horizontal axes.

There may be third releasable pivot means having an axis spaced further from the deck than the axis of the first pivot means so that on release of the first and second pivot means the wall may pivot about the third pivot means.

The third pivot means may be cooperable with an upper edge of the other wall part.

There may be posts at two corners of the deck, said first pivot means being cooperable with the posts.

The posts may be extendable, a cross-member connecting upper ends of the posts in the extended position, said third pivot means being cooperable with the cross-member.

In the case of a self-propelled vehicle having a deck or platform, a tailgate could be formed by said two parts.

The vehicle may comprise means operable to provide an extension and said wall being movable to lie on the extension to provide an extension of the vehicle deck.

The means operable to provide the rear extension may comprise beams slidable within fore-and-aft beams of the vehicle deck or chassis.

The wall may take the form of a tailgate having said two parts hinged at adjacent edges, and means for lowering and raising the tailgate.

The lower edge of the front tailgate part may be hinged to the rear of the vehicle so that the tailgate can be lowered and raised about this hinge. This hinge can be releasable to allow the vehicle to be used as a tipper when the tailgate is raised.

Winch means may be provided for lowering and raising the tailgate. The winch means may comprise posts at the rear corners of the vehicle deck with cables extending along the posts and connected to the front tailgate part adjacent said adjacent edges.

Also according to this invention a suspension device for a vehicle comprises first and second parts arranged in use for relative up and down movement, and elastomeric spring means between the first and second parts, relative lateral movement between the first and second parts being resisted by engagement of these parts.

In one arrangement the first part is in sliding engagement with the second part. Preferably the first part can slide within the second part.

The first and second parts may have opposed projections for locating end portions of the spring means.

The spring means may comprise a plurality of rubber springs. The spring means may comprise softer spring means and harder spring means.

Removable means may be provided for limiting the relative up and down movement between the first and second parts; said means may comprise removable pins.

The second part may be a box-section, the pins extending between opposed sides of the box-section and engageable by end portions of the first part.

The second part may have a top wall, opposed side walls and end walls. The side walls may have opposed cut-outs which slidably receive a cross-member of the first part, the spring means being located on both sides of the cross-member.

The device may comprise two such devices pivotally connected and respectively for mounting on the axles of a tandem axle.

The invention also includes a vehicle having such a suspension device.

The invention also includes a kit of parts comprising rubber springs, and first and second parts, for assembly into such a device.

The invention may be performed in various ways and some specific embodiments with possible modifications will now be described by way of example with reference to the accompanying drawings in which.

Figure 1:
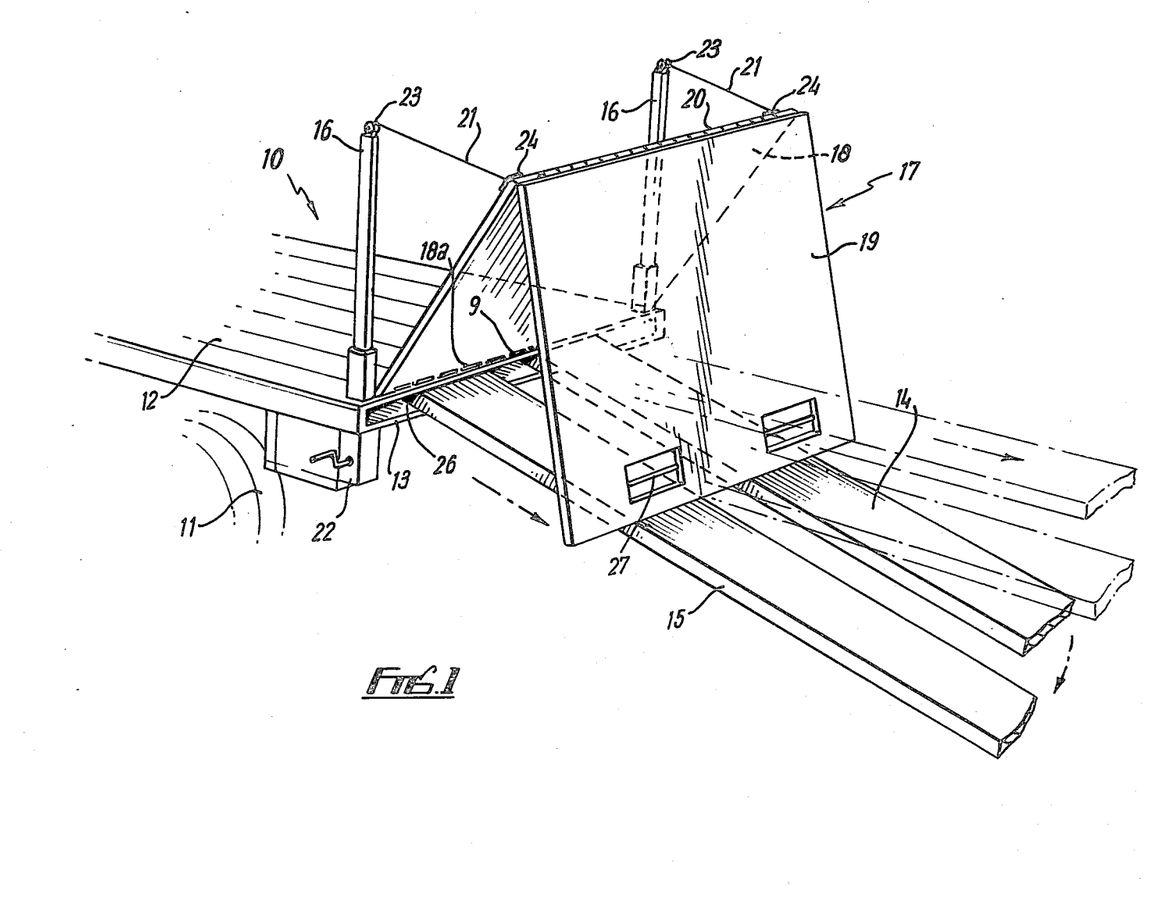
FIG. 1 is a perspective view of a vehicle tailgate and support.

Referring to FIG. 1, a vehicle or truck 10 has rear side wheels 11 (only one shown) and a body comprising a flat deck or platform on parallel fore-and-aft extending laterally spaced hollow steel beams 13 forming part of the deck or vehicle chassis. Two laterally spaced beams 13 slidably receive two further hollow box-section steel beams 14, 15 referred to later.

A tailgate 17 is in two parts 18, 19 pivoted together by hinge 20 at adjacent edges. The opposite edge of part 18 is releasably hinged to the rear edge of deck 12 at 18a.

At the two rear corners of the deck 12 are respectively two vertical posts 16.

Winch cables 21 respectively extend through the posts 16 from winch controls 22 (only one shown) beneath the deck 12 and extend round pulleys 23 at the tops of the posts 16 and are connected to opposite sides of the tailgate part 18 near the hinge 20. In a modification, one cable 21 and control 22 are omitted. The vehicle has side walls (not shown). In the closed, vertical, position of the tailgate the lower edge of the rear tailgate part 19 is secured to the rear of the front tailgate part 18 by suitable means 9 and releasable bolts indicated schematically at 24 secure the parts 18, 19 to the posts 16.

When the vehicle is used for tipping, the hinge 18a is released as usual and the tailgate can pivot about bolts 24 held in posts 16 as the front of the deck 12 is pivoted upwards.

When it is desired to carry bulky loads, for example baled hay, the two beams 14, 15 are drawn rearwards, for example by two thirds of their length, to form a horizontal extension of the beams 13. This is shown in chain-dotted lines. The bolts 24 can then be released, the connection 9 is released and the winch controls 22 operated to lower the tailgate to bring the parts 18, 19 to lie flat on the beams 14, 15 to form a flat horizontal extension of the deck 12. Releasable locking means such as a twist lock indicated diagrammatically at 26 are respectively provided for holding the beams 14, 15 in their forward and rearward positions.

In a further configuration, the beams 14, 15 are pulled rearwards substantially their full lengths and swung down as shown in full lines to form a ramp; in this position also the hinged tailgate 17 can be lowered to lie flat on the beams 14, 15. Hand grips 27 are provided in the part 19 for assisting in moving or guiding the tailgate.

The low-angle heavy duty ramp is capable of mounting heavy crawler/tractor equipment, and when used with cattle side gates on the vehicle can form the basis of a heavy duty cattle and sheep trailer for use with quick-fit silage extensions.

In a further arrangement the invention is applied to a trailer. Either the front wall or the rear wall are formed by the two parts 18, 19 and the beams 14, 15 may correspondingly be extended to the front or rear of the trailer platform.

In a modification the front wall or tailgate may be in three sections hinged together at adjacent edges, so that the intermediate section is hinged at two opposed edges.

In a further modification a horizontal hydraulic ram is located beneath the deck and driven from the vehicle engine. The ram is connected to a cross-member between the beams 14, 15 so that when energised the beams are extended. The lower end of the tailgate section 19 is connected to the outer ends of the beams so that as they are extended the tailgate unfolds with them.

Instead of this, a winch could be arranged to simultaneously extend the beams and unfold the tailgate.

The beams 14, 15 need not be box section.

In a further modification the tailgate may be unfolded and lowered to form a ramp, without the beams 14, 15 being pulled rearwards from their stored position in beams 13.

Figure 2:
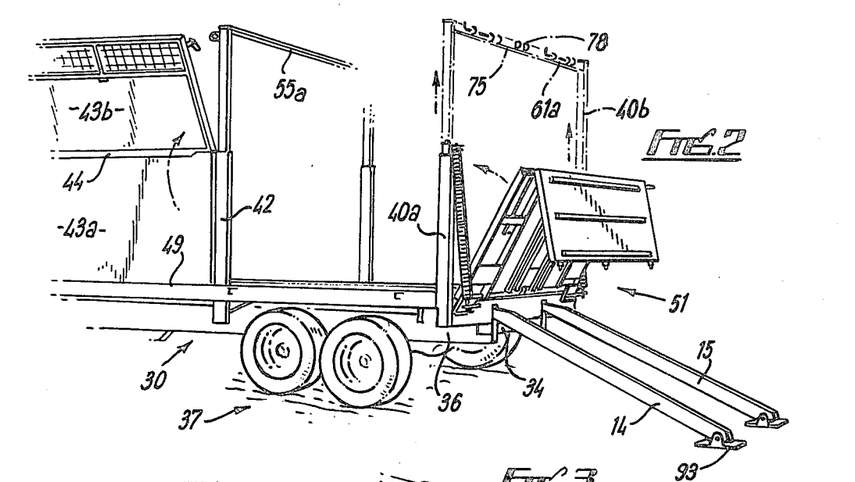
FIG. 2 is a perspective view of another tailgate in a first position on a trailer.
Figure 3:
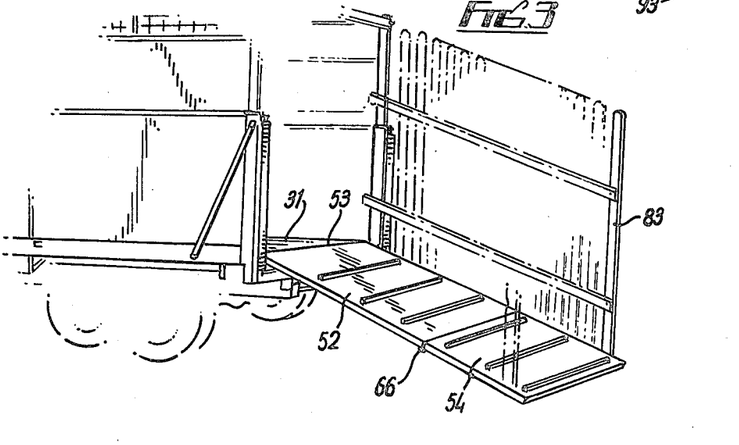
FIGS. 3 and 5 show the tailgate of FIG. 2 in other positions.
Figure 4:
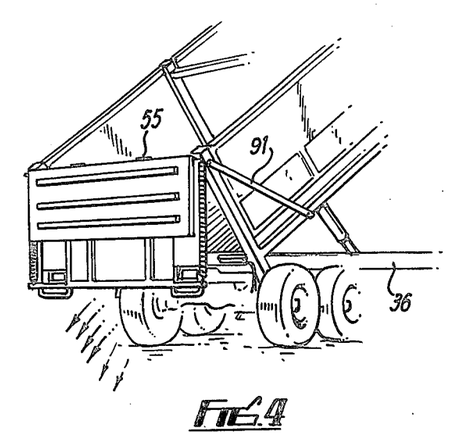
Figure 5:
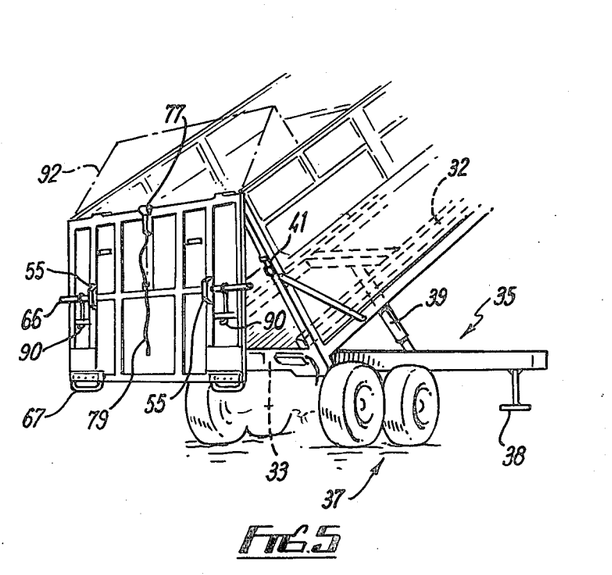
Figure 6:
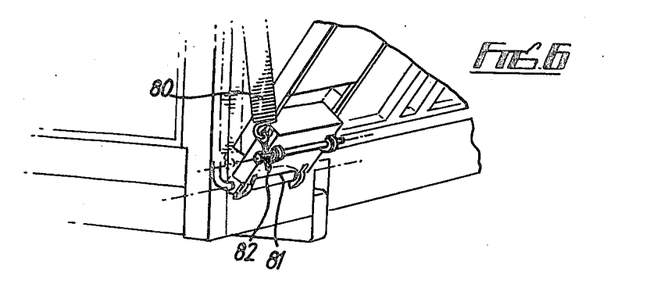
FIGS. 6 to 9 are perspective views of hinge parts of FIG. 2 on a larger scale.

Referring now to FIGS. 2 to 9, a trailer 30 has a flat deck 31 extending on laterally spaced parallel box section deck beams 32 pivoted at their rear ends 33 to a rear cross member 34 of a chassis 35 including two box section beams 36 beneath the beams 32. Pairs of rear wheels 37 are suspended from the chassis which at the front is provided with a ground engaging foot 38 and an eye-ring for receiving a towing hook of a tractor or other mobile pulling device. A hydraulic ram 39 is mounted beneath the deck 31 extending between cross-members of the deck and chassis and is arranged for connection to a source of fluid pressure driven by the tractor engine for pivoting the deck upwards about the transverse rear axis for tipping, as shown in FIGS. 4, 5 in known manner. Beams 14, 15 are provided as in FIG. 1, received in beams 32. In this case the rear corner posts 40 comprise two telescoped parts 40a, 40b. In FIG. 2 the post part 40b is retracted. In the extended position the part 40b is held by a manually releasable spring-loaded detent 41 which on release enables the part 40b to be dropped down. The extended position is shown chain-dotted. The detent 41 in the extended position engages in an aperture, or on the top of, post part 40a. Similar posts are provided at the front corners (not shown) and intermediate positions 42 on the sides.

The side walls (and front wall) of the trailer are provided with panels each of which comprises two parts 43a, 43b hinged together at 44 so that with the post parts 43b retracted (FIG. 4) the panel part 43b lies outside the panel part 43a but can be hinged up (FIGS. 2, 5) when the posts are extended, the panels being held in the various positions by manually releasable locking levers or pins. One suitable manually operable locking pin is that sold under the name antiluce illustrated in FIG. 7 in which a pin 45 has a transverse aperture receiving an oval member 46 which can be brought to a position forming an extension of the pin so that the pin 45 and member 46 can pass through an aperture 47 in a lug 48 whereafter the member is moved to lie transverse to the pin 45 to prevent its removal from the lug, the pin being releasable by a reverse process. The panels 43a are hinged to the deck at their lower edges 49 so that they can be pivoted down to lie on the deck. Cross-members 55a can be releasably connected to the tops of the posts. In FIG. 2 some side panels have been omitted.

Figure 8:
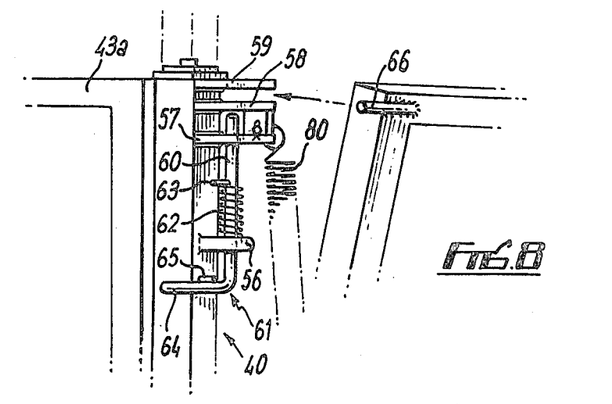

The tailgate 51 comprises a front or lower part 52 releasably hinged at 53 to the rear edge of the deck, and an upper or rear part 54 hinged at laterally spaced hinges 55 to the upper edge of the tailgate part 52 so that the upper part 54 can be swung down about hinge 55 to lie rearwards of part 52 (FIG. 4). The upper edge of part 52 is releasably hinged to the posts 40 above the deck. Thus as shown in FIG. 8, each post 40 has fixed to it four vertically spaced lugs 56–59 with aligned apertures which can receive the upright arm 60 of an L-shaped bar 61. A helical spring 62 extends between lug 56 and a pin 63 on the arm 60 to bias the arm 60 upwards. The bar 61 is held in the down position shown by engagement of arm 64 of bar 61 beneath a pin 65 fixed to post part 40a. In this position circular bars 66 extending laterally from sides of gate part 52 near the upper or rear edge thereof can respectively be brought between lugs 58, 59 and the bar 61 is then rotated to free the arm 64 from pin 65 and the locking bar 60 moves upwards into the apertures in lugs 58, 59 to hold the bar 66. The hinge 53 can then be released to allow the tailgate to swing about bars 66 (FIG. 4) for tipping.

Figure 9:
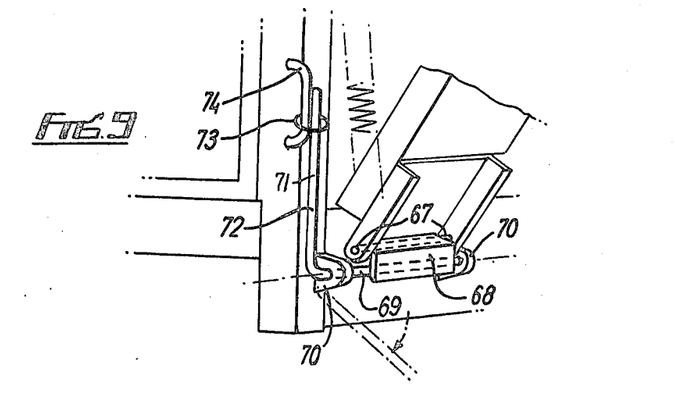

FIG. 9 illustrates one form of releasable hinge 53. The lower edge of gate part 52 carries two spaced transverse bars 67 and in the closed position (FIGS. 2, 9) this is located behind an L-section plate 68 fixed to an arm 69 of L-shaped bar 71 rotatable in lugs 70 fixed to the rear cross-member of the deck and the post. The other arm 72 of bar 71 can be held in the closed position by ring 73 manually slidable on U-member 74 fixed to the post 40. On release of the arm 72 by movement of ring 73, the arm 72 can be rotated to move plate 68 clear of bar 67 to release the hinge. In the closed position the tailgate can pivot on bars 67 (FIG. 2, 3).

Figure 7:
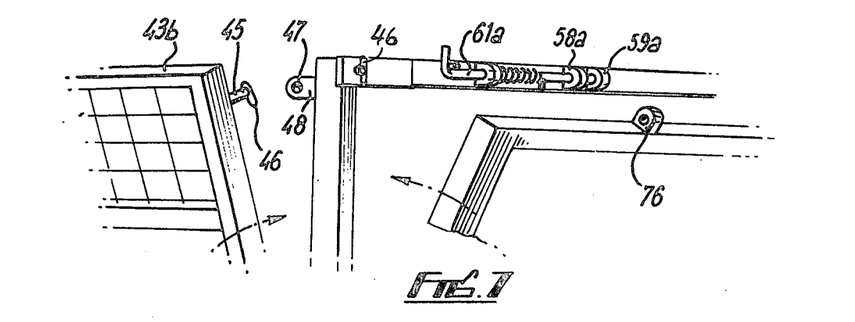

When the posts 40 are manually extended, a rear cross-member 75 can be releasably connected between the rear posts using locking devices 45-48 (FIG. 7). The cross-member 75 carries manually releasable L-shaped bars 61a and associated parts similar to those in FIG. 8 so that when the tailgate part 54 is hinged upwards (FIG. 5) lugs 76 on the top edge may be received between lugs 58a, 59a and releasably held by bar 61a. The hinges 53 and 66 can then be released to allow pivoting about bars 61a (FIG. 5). A spring-loaded plunger 77 can engage in a holder 78 on the cross-member 75 to hold the tailgate in the extended, closed position, the plunger being releasable by pulling cord 79. Manually releasable devices 90 similar to those shown in FIG. 8 lock the gate part 54 in the up position (FIGS. 3, 5).

The manual up and down movement of the tailgate is assisted by helical springs 80 (not shown in FIG. 5) which respectively extend between the upper end of post part 40a and a part 81 fixed to the lower corner of the lower tailgate part. The arrangement is such that the springs provided a two-way over-centre action so that on lifting the tailgate from the down position of FIG. 3, a short initial upward movement is against the action of the springs whereafter the springs go over-centre and then assist in moving the tailgate to the up, closed, position. Conversely when pulling the tailgate down (FIG. 2) form a closed position, an initial movement is against the action of the springs whereafter the springs go over-centre and assist the lowering of the tailgate. The lower end of the spring is connected to a threaded bar 82 received in part 81 so that the length of spring 80 can be slightly adjusted.

Thus in one condition, the tailgate part 54 hangs down (FIG. 2), the post parts 40b are retacted, the hinge 53, 67 is engaged, and manually releasable locking pins or levers hold the tailgate closed. From this condition, the locking pins or levers may be released and the tailgate pulled down (FIG. 2)—with or without rearward extension of the beams 14, 15—to form a ramp 50 (FIG. 3). Wood railings 83 may then be placed on the sides of the ramp for loading cattle. One of these railings may extend across the rear of the trailer, in front of the now-closed tailgate, during transport of the cattle.

Alternatively, the hinge 53, 67 may be released (FIG. 4) and the tailgate can then swing about a horizontal transverse axis provided by the locking pins or levers 66 which engage with the corner posts (FIG. 4). The trailer deck can then be raised for tipping.

For transport of bulkier loads, the tailgate part 54 is in the extended position and hinges 61a engaged. For tipping the hinge 67 and intermediate locking levers or pins 66 can then be released so that the tailgate can swing about its top edge (FIG. 5) at axis 61a at a greater height above the deck than bars 66.

Detachable bracing elements 91 are provided.

Figure 10:
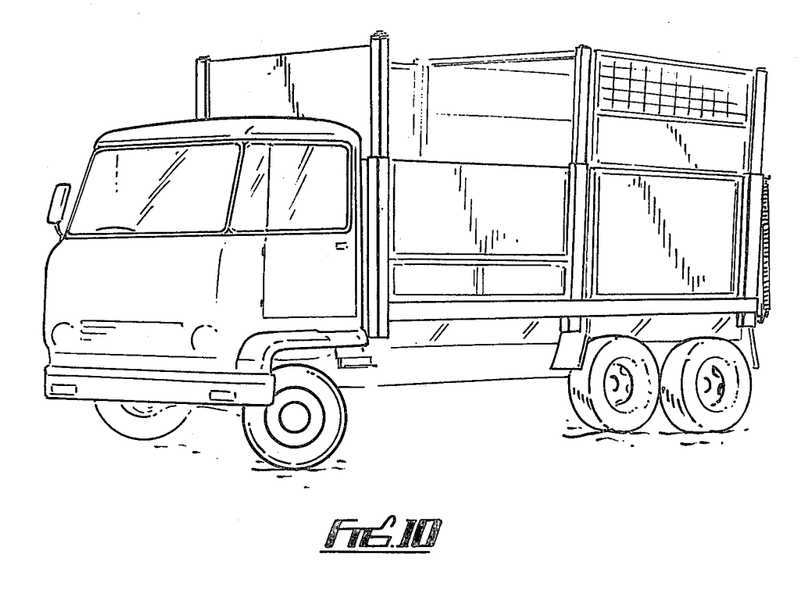
FIG. 10 is a perspective view of a vehicle.

The tailgate arrangement of FIGS. 2 to 9 can be provided on a self-propelled vehicle such as shown in FIG. 10.

The beams 14, 15 (which may have pivoted, detachable, feet 93) can be partly extended rearwards as described above and support the parts 52, 54 as a horizontal extension of the deck.

An extension 92 can be releasably fitted for collection and transport of silage.

In a modification the upper side panels 43b pivot inwards and the lower side panels pivot outwards.

The vehicle is advantageously provided with a suspension as illustrated in FIGS. 11 to 16.

Springs have long been a problem in off-highway vehicular suspension design because of the heavy loads and great variation between empty vehicle weight and loaded vehicle weight. Constant rate leaf springs must be designed with a high rate to handle maximum loads. This type of suspension, therefore, at empty load or less than full load, provides very little shock protection for the vehicle or comfort to the driver. Other types of heavy duty off-highway equipment springs, such as hydro-pneumatic, viscoelastic, and stacked pads, either consist of many moving parts, require continuous lubrication, require constant surveillance of high pressure fluids, have high pressure seals on moving parts, or are a combination of these elements, and all are subject to maintenance problems. Maintenance problems means substantial maintenance costs and reduced machine availability.

The vehicle suspension system illustrated may be used in trailers and self-propelled vehicles, for example bulk high-sided tippers, for example for grain, sugar beet or sand; drop-sided flat decks for heavy palletised materials, for example fertiliser, cement and bricks; long-body trailers for bulky baled materials, for example hay and straw; low loaders for heavy plant and machinery, for example crawlers and tractors.

The unit can accommodate a range of rubber cord bias, shape and size options and can be tailored to suit various load/suspensions specification, within a single size box.

Figure 11:
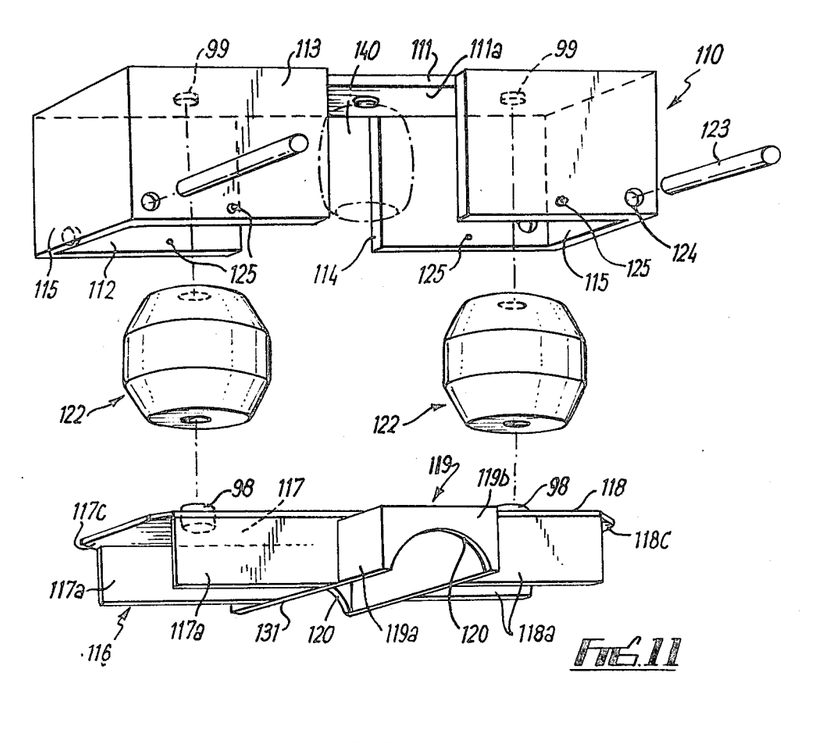
FIG. 11 is an exploded perspective view of a suspension device.

The suspension system is shown in an agricultural trailer. The system comprises an upper box part 110 having a flat top wall 111, flat side walls 112, 113 each having a rectangular cut-out 114, and flat end walls 115. The part 110 is made from sheet steel pieces welded together.

The underface 111a of the top wall 111 is provided with two spaced circular-section bosses 99. The lower box part 116 is similarly of welded steel pieces and comprises a top having parts 117, 118 with depending walls 117a, 118a; and top cross part 119 beneath the top and between walls 117a, 118a having depending side walls 119a, and end walls 119b each providing concavely curved edge 120. Upstanding from the upper surface of walls 117, 118 are circular-section projections 98 confronting respective bosses 99. An aperture extends through each boss 98 and the top of part 116 for flow of air. An aperture extends through each boss 99 and top wall 111 for flow of air.

The outer surfaces of walls 117a and 118a are a close sliding fit with the inner surfaces of walls 112, 113. Two rubber suspension pads 122 are respectively received on the projections 98 and 99. Each pad 122 is hollow and is better seen in FIG. 13. Each pad 122 has a central passage which widens in the middle. The outer surface has outwardly extending end sections 122a, 122b and has an axial intermediate section 122c. The end surfaces 122d are flat. The end portions 122e, 122f in use are closely but removably received on bosses 98, 99 respectively. A typical pad is Aeon rubber spring type 1525 made by Firestone Tire & Rubber Co. Limited of Manchester, England. Other forms and shapes of pad are possible. For example pads incorporating cord or fabric layers in their outer regions, for example those sold under the name Marsh Mellow ® by Firestone Tire & Rubber Co. Limited.

The pads 122 are placed under initial axial compression and strong pins or bars 123 are placed through apertures 124 in walls 113, 114 and engage the under-faces of the marginal end regions 117c, 118c of walls 117, 118 to hold the assembly together. Split pins (not shown) extend through diametral apertures in the end regions of bars 123 and engage the outer surfaces of walls 112, 113 to prevent axial movement of the bars 123.

It will be noted that the outer peripheries of the pads 122 are spaced from the inner surfaces of walls 112, 113 and 115. In use, generally speaking, they are intended to remain free of contact from these surfaces, but it will be understood that if the vehicle goes over a particularly large bump or a particularly deep pot-hole the pads 122 may briefly engage one or more of these surfaces.

Grease nipples 125 are provided for lubricating the sliding side surfaces of parts 110 and 116.

Figure 12:
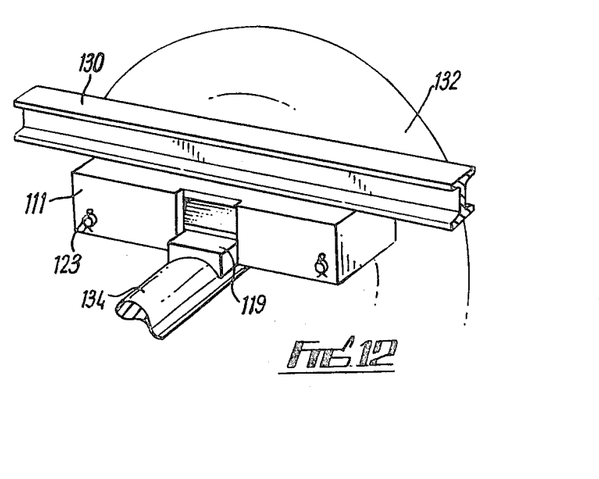
FIG. 12 shows the device of FIG. 11 installed in a trailer.
Figure 13:
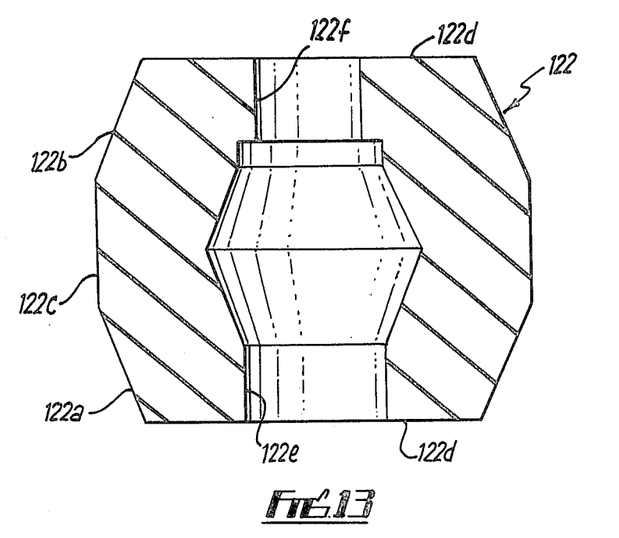
FIG. 13 is a vertical central section through a rubber spring.

In use, for example as shown in a trailer of FIG. 12, the top wall 111 is welded to a chassis girder 130 and the curved surfaces 120, and possibly also edges 131 of walls 119a, are welded to the axle casing 134 of wheel 132. Relative up and down sliding movement between parts 110, 116 is cushioned by rubber spring pads 122 to provide a resilient mounting for the wheel.

It will be understood that in some cases the suspension system could be located upside down from the position shown, and be located between an axle and a chassis girder beneath the axle.

Each axle is provided with two similar suspension systems.

Instead of being welded to the axle, the part 116 could be held by U-bolts extending through the cross-part 119 and secured around the axle.

The suspension unit can readily be inserted in an existing trailer which does not have a suspension and in which the axle is, for example, welded to the chassis, by separating these parts and interposing the suspension system and welding it in place.

It will be understood that relative sideways movement between the parts 110, 116 which might cause the rubber springs 122 to shear, is effectively prevented by the interengagement of the parts 110, 116.

The parts can readily be disassembled and re-assembled if it proves necessary to replace a pad 122.

The suspension device provides good anti-roll characteristics for soft and rough ground with high or low loads.

The spring 122 may comprise a cylindrical hollow body of elastic material such as natural or synthetic rubber, or synthetic plastics, in which the hollow body is formed to provide intermediate its length a constriction in at least one transverse plane, said constriction counteracting the free expansibility in the plane thereof on loading of the spring in its longitudinal direction and, due to the consequential partial restriction of the inner hollow space above and below the constriction plane, transverse expansion planes having a small transverse expansion are formed, whereby a large maximum deflection of the spring is possible without lateral displacement, together with a continuously progressively increasing load-deflection characteristic line.

In a modification the section 110 is incorporated in a structural member of the chassis.

It will be understood that the sections 110, 116 may receive pairs of rubber springs of different characteristics depending on the requirements of the vehicle.

Instead of being made from welded pieces, the sections could be formed by bending sheet metal.

In a modification shown in FIG. 11 an additional softer central rubber pad 140 is provided for acting as the suspension at no load and this is longer than the two outer pads 122 which are of harder rubber and provide a harder suspension for the load. At no load, the outer pads are not operative; on adding load the centre pad compresses until the plate 111 engages the outer pads as the load increases.

In a further arrangement the outer pads are longer and softer and the central pad is harder. Other arrangements of pads are possible to give a desired suspension characteristic.

The plate 117 may have a dimension such as to have a small tolerance, for example 1/16 inch (0.16 cm), all round with respect to the inner surface of the walls 112, 113, 115.

The end faces of walls 112, 113 may have laterally outwardly extended flat additions for engaging the outer faces of sides 119a to act as an anti-torque device during braking of the vehicle.

The walls 119b can be replaced by a square section device for use with a square section axle.

Bushes 99 and/or 98 can be omitted.

Figure 14:
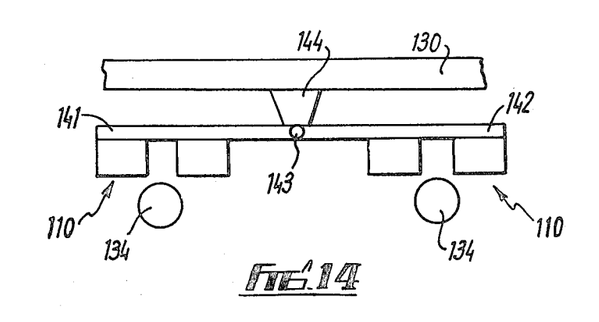
FIG. 14 is a modified arrangement.

In the case where the device is to be used with a dual or tandem axle, see FIG. 14, two devices as in FIG. 12 are respectively connected to the axles 134 by rigid members 141, 142 welded to respective plates 111 which are pivoted on transverse pivot 143 connected to bracket 144 fixed to chassis member 130.

In a modification the plates 111 of the two devices are extended and pivoted together and the separate members 141, 142 are omitted.

With these arrangements the loads on the axles are substantially equalised, and in the case of an agricultural implement or vehicle the axles can accommodate irregular ground and can articulate relative to each other.

Figure 15:
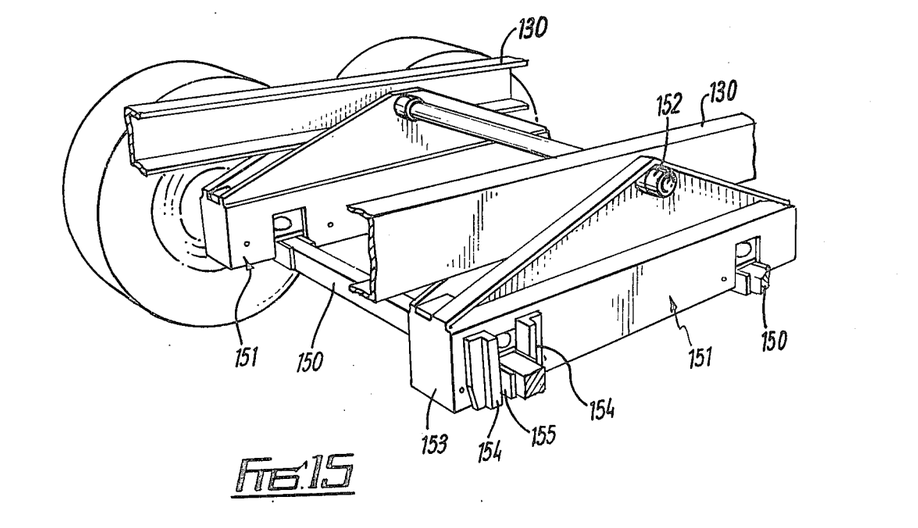
FIG. 15 is a view of an arrangement similar to FIG. 14.
Figure 16:
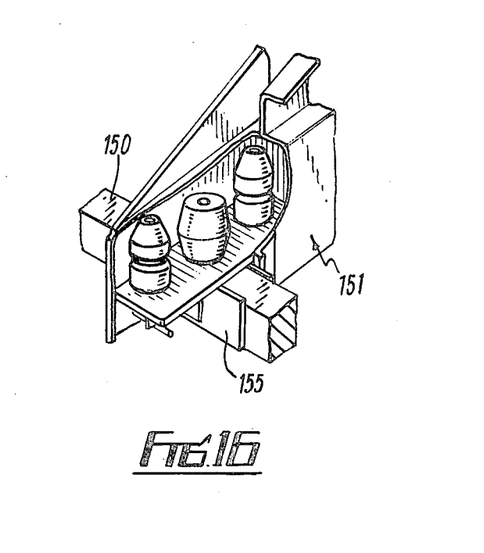
FIG. 16 is a view of part of FIG. 15 with part cut away.

FIGS. 15, 16 illustrate a preferred two-wheel suspension for a trailer. The wheels are rotatably carried on the ends of square section axles 150 and box-section members 151 are pivoted at 152 to chassis girders 130. The members 151 from a swinging unit. The box part 153 similar to part 110 has side extensions 154 providing flat surfaces engaging surfaces 155 similar to 119a. This provides good resistance to turning of the axle on braking. Three pads are provided, the two outer ones being slightly longer and softer than the middle pad so that initial movement of part 155 relative to part 153 is cushioned by the other pads. The wheels may be provided with air-operated brakes, a valve for each wheel being located on the axle.

Each member 151 has one anti-torque device 154, 155, the anti-torque devices being at opposite corners of the unit.

It will be appreciated that in the rocking beam arrangement of FIGS. 15, 16 each pair of wheels is connected by a common axle and when one of these wheels moves up and down in relation to the other the rubber springs, in addition to accommodating the vertical shock loads, also accommodate lateral loads so that the axle and box parts 151, 153 are not unduly stressed; the axle in effect rotates about a fore and aft axis. Both axles can thus articulate, possibly independently and in opposite senses.

With this arrangement therefore, it is possible to use in FIGS. 15, 16 a driven axle in a casing on which is mounted the unit 151 and a central differential would be used.

A hydraulic ram may extend between one of the axles and the chassis to raise as desired one pair of wheels from the ground to reduce tire scrub in turning, tire wear when unladen, and to increase axle load and thus give improved traction on driven axles as desired on slippery ground.

In a modification the section 116 is transverse to the vehicle and the wheels are rotatable on its ends and the springs allow rocking of section 116 as well as accommodating vertical loads.

We claim:

1. A vehicle comprising a body having a deck and a wall, a structure extending upwardly with respect to the deck at the ends of the wall, the wall comprising two parts, first pivot means connecting the wall parts and releasably cooperable with the structure, second pivot means for releasably connecting the deck and a lower edge portion of one wall part, third pivot means for releasably connecting an upper edge portion of the other wall part and said structure further from the deck than the first pivot means, so that on release of the first and third pivot means the wall can pivot on the second pivot means and on release of the first and second pivot means the wall can pivot on the third pivot means and on release of the second and third pivot means the wall can pivot on the first pivot means.

2. A vehicle as claimed in claim 1, in which the upwardly extending structure comprises extendable posts, a cross-member connecting the upper ends of the posts in the extended position, said third pivot means being connected to the cross-member.

3. A vehicle as claimed in claim 1, including means for raising and lowering the wall about the second pivot means.

4. A vehicle as claimed in claim 3, in which the means for raising and lowering comprises winch means.

5. A vehicle as claimed in claim 4, in which the winch means comprises cables extending through posts at two corners of the deck and connected to the wall adjacent said horizontal axis.

6. A vehicle as claimed in claim 1, including two-way over-centre spring means operable during raising and lowering of the wall about the second pivot means.

7. A vehicle as claimed in claim 1, including means operable to provide an extension of the body, said wall being movable about the second pivot means to provide an extension of the deck.

8. A vehicle as claimed in claim 1, in which the wall forms a tailgate.

9. A vehicle as claimed in claim 1, including means for pivoting said deck about a transverse axis adjacent said wall for tipping.

10. A vehicle as claimed in claim 1 including a suspension device comprising first and second parts arranged in use for relative up and down movement, elastomeric spring means between the first and second parts, and cooperable means carried by said first and second parts for resisting relative lateral movement between the first and second parts.

11. A vehicle as claimed in claim 1, in which the first pivot means comprises a pivot connection between the wall parts and a releasable pivot connection between the one wall part and said structure.

* * * * *